US005633836A

United States Patent [19]

Langer et al.

[11] Patent Number: 5,633,836

[45] Date of Patent: May 27, 1997

[54] ACCELERATED DEVELOPMENT TIME-DELAYED MESSAGE SYSTEM

[75] Inventors: Robert Langer, Newton; Mark E. Johnson, Allston, both of Mass.; Allan G. Sacks, Stamford, Conn.

[73] Assignee: Noteworthy Products, Inc., Stamford, Conn.

[21] Appl. No.: 566,791

[22] Filed: Dec. 4, 1995

[51] Int. Cl.[6] .......................... G04B 17/00; G01N 31/22

[52] U.S. Cl. .......................... 368/327; 116/200

[58] Field of Search .......................... 368/327; 116/200, 116/207, 217, 360

[56] References Cited

U.S. PATENT DOCUMENTS

| | | |
|---|---|---|
| 3,520,124 | 7/1970 | Myers . |
| 4,212,153 | 7/1980 | Kydonieus et al. . |
| 4,903,254 | 2/1990 | Haas . |
| 5,058,088 | 10/1991 | Haas et al. . |
| 5,085,802 | 2/1992 | Jalinski .......................... 252/408.1 |
| 5,107,470 | 4/1992 | Pedicano et al. . |
| 5,182,212 | 1/1993 | Jalinski .......................... 436/6 |

*Primary Examiner*—Bernard Roskoski
*Attorney, Agent, or Firm*—Handal & Morofsky

[57] ABSTRACT

A time-delayed message indicator system typically displays a printed message pattern on a contrasting viewing surface at a predetermined time after activation. One preferred indicator system employs a migrating message pattern and has a laminar, multilayer construction. The message is printed on a source layer using a migratable ink. An opaque layer overlies the source layer and a release layer protects the migratable message from contact with the opaque layer until the system is activated by removal of the release layer initiating migration of the message ink through the opaque layer. Arrival of the message agent at the viewing surface initiates development of a visible message pattern. To enhance the development process the invention includes a message development trigger, for example, a heating system. The heating system can consist of exothermic chemical reactants that are mixed to react and produce heat, for example by oxidizing iron filings or activated carbon. Other embodiments employ buffered pH indicators and a migrating acid or base.

11 Claims, 5 Drawing Sheets

DYE MIGRATION ACCELERATION BY THERMAL-ACTIVATION IN BIPHASIC TEMPERATURE EXPERIMENT

ACCELERATED DEVELOPMENT TIME-DELAYED MESSAGE SYSTEM

TECHNICAL FIELD

The present invention relates to the field of time-delayed message systems which can display a simple visual message at a predetermined interval after activation. More particularly, it relates to time-delayed message systems suitable for embodying in laminated printed media wherein the message is constituted by ink migrating through an opaque film. The system can be activated by removal or peeling back, of a release layer which release layer isolates the ink from the opaque film prior to its removal.

BACKGROUND

U.S. Pat. No. 4,212,153 to Pedicano and U.S. Pat. No. 5,107,470 to Pedicano and Sacks disclose time-delayed ink message display systems which are multilaminate labels composed of a set of upper layers and lower layers, as shown in FIG. 1 of the accompanying drawings. The upper layers comprise at least a clear polyester protective film through which the message may be seen, an opaque pressure sensitive adhesive migration layer for attaching the upper layers to the lower layers, and a release liner to prevent activation of the system. Additional layers may be added to the upper layers, as shown in FIG. 1 herewith. Addition of a polymer film, with another layer of pressure sensitive adhesive, may be included to slow the dye migration and extend the amount of time required for the message to appear through the Mylar film. The lower layers consist of, at a minimum, ink printed onto a polymer substrate, which is typically polyester. The system is initiated by removal of the release liner and attachment of the upper layers to the lower layers. Over time, the dye in the ink diffuses through the upper layers and gradually becomes visible to the human eye as the ink reaches the top. The ink may be printed onto the substrate such that a message appears after some time. Such messages may appear in the form of words or a picture meant to have a specific and evident meaning.

Time-delayed message systems have a wide variety of applications especially in the medical field. For example, self-administered medical diagnostic kits can require the careful monitoring of time. Since people's perception of time varies drastically, a time-delayed message system which produced the word "STOP" at a predetermined time would be of great value and add significantly to the efficacy of diagnostic kits. Other medical applications include use of the message systems as a timing device to remind patients to take their medications, or to change a transdermal drug delivery patch after a predetermined amount of time.

Known time-delayed message systems, shown in FIG. 1, have the characteristic that the dye, and hence the message, gradually appear at the top of the upper layers over time. When the system is first activated, the message is not immediately visible. As the dye diffuses through the upper layers, the message slowly begins to appear. At first, the message is hint and unreadable. As the message becomes slightly stronger, some individuals can read it while others are cannot. The more time that passes, the stronger the message becomes and the more people can read it. Eventually, the message becomes sufficiently strong and clear as to be readily readable. A fundamental characteristic of such systems is the gradual, time-related development of the message. This presents a practical limitation of message display systems in that the amount of time which the message is delayed is ill-defined and can vary considerably from person to person due to differences in individual perception, (A quantitative example of the gradual nature of these systems will be described below). The slow visual development of known systems is a result of the inherent mass transfer properties of solutes diffusing through matrices. In this context the message ink or dye is a solute and the migration layer of adhesive, optionally with a polymer layer, is the matrix. A principle of physics, Fick's law states that the rate of solute diffusion through a homogeneous slab will be constant during steady-state conditions. Frick's Law presents a problem in attempting to accelerate the visible message development phase of a time-delayed migrating ink message. The physical limits of film thickness necessary to retain structural integrity and opacity (without which the message image printed on the lower layers will be visible at all times), impose a significant time limit on the development phase during which the displayed image develops from a perceptible contrast area to a recognizable message or image. Consequently, the message image may be visible in a shadowy or embryonic form before it is legible, and may be unduly slow to develop, providing a confusing or unaesthetic effect. The message display system lacks "focus". In most cases, the message will be time-sensitive, for example to indicate a time to take a medication, and its slow development will cause serious uncertainty.

SUMMARY OF THE INVENTION

The invention, as claimed, is intended to provide a remedy. The invention provides a time-delayed inked message display system which solves the problem of producing a message in a rapid manner after a time delay.

To solve this problem, the invention provides a time-delayed message display system for displaying a message pattern of a colorant on a viewable surface against a contrasting background for viewing by reflected light, at a predetermined time after activation which message display system has an essentially laminar, multilayer construction. The message display system of the invention can comprise:

a) a source layer supporting a migratable message agent;

b) an opaque layer to overlie said source layer, said message agent being migratable through said opaque layer; and c) a release layer protecting said message agent from contact with said opaque layer, said release layer being removable to activate the system by initiating migration of said message agent through or to said opaque layer;

wherein arrival of said message agent at said viewable surface initiates development of a visible message pattern, said message display system further comprising:

d) a message development trigger to promote development of the message; and, optionally, e) a trigger delay means to delay action of said message development trigger;

whereby development of said visible message is accelerated and, optionally, initiation of development is delayed by said trigger delay means.

The message development trigger improves the focus of the message greatly shortening its development time. The trigger delay means enable the message system to retain its delay characteristics by avoiding premature triggering of message development.

Pursuant to the invention, various means have been discovered that can function satisfactorily as development triggers. One type of development trigger employs heating means to heat the system's migration layer or layers and greatly accelerate the passage of the message agent through that layer. Exothermic chemical heating systems are convenient and economical for this purpose. To this end, in a preferred message display system according to the invention the message agent comprises a migratable colorant material, the message development accelerator comprises a chemical reactant heating system and the trigger delay means comprises a removable barrier preventing said chemical reaction. Preferably, the migratable colorant material is an ink printed in a message pattern on the source layer and the chemical reactant heating system comprises an air-oxidizable reactant, e.g. catalytically activated iron filings. The removable barrier can take various forms and may, for example, comprise an external sealant film enclosing the display system. The sealant film can take the form of external packaging which is easily removed to permit air to permeate into the development trigger to oxidize the air-oxidizable reactant, with the generation of heat that is passed to the migration layer speeding migration of the message agent and reducing development time.

Alternatively, the removable barrier can comprise a degradable coating encapsulating the chemical reactant. Degradation of the coating, for example by an acid or enzyme additive, permits release of the reactant with exposure to a co-reactant or air to commence the exothermic chemical reaction. In either case, the time required for removal of the reactant-protective barrier will affect or determine the message system's delay characteristics.

Preferably, the opaque layer comprises at least one film of migration rate controlling material having a thickness and composition selected to provide a desired migration time.

A desired degree of focus of the message display system can be obtained when the predetermined time has a duration at least ten times that of the message development time measured from a point at which said message pattern is discernible to a point at which it is clearly legible or recognizable or otherwise determinable. Such a message system may be said to have a focus ratio of ten. Sharper focus ratios of twelve, fifteen, or even twenty are desirable. So long as the delay period of the message system is not prejudiced, the message development period can be as short as is attainable, substantially instantaneous or sub-second development being an ultimate goal.

An alternative preferred message development trigger is pH-based. In such an embodiment, a message development system employs a pH-indicating dye to provide the colorant message pattern. The migratory message agent constitutes the message development trigger and comprises a pH-changing migratable acid or base while the trigger delay means comprises a basic or acid buffer, respectively, to delay pH changes at the visible surface, whereby migration of sufficient acid or base to the visible surface provides a rapid color change in the pH-indicating dye. If the dye or the migrating acid or base is appropriately patterned, the message will be depicted in the new color.

In another aspect, the invention provides a time-delayed message display system for displaying a message pattern of a colorant on a viewable surface against a contrasting background for viewing by reflected light, at a predetermined time after activation, said message display system having an essentially laminar, multilayer construction and comprising:

a) a source layer supporting a printed image of said colorant in a desired message pattern;

b) an opaque layer to overlie said source layer, said colorant being migratable through said opaque layer; and c) a release layer protecting said colorant from contact with said opaque layer, said release layer being removable to activate the system by initiating migration of said colorant through or to said opaque layer;

wherein said message display system further comprises:

d) a chemical reactant heating system to trigger rapid development of the message at said visible surface by heating said opaque layer and a removable barrier preventing said chemical reaction.

In a further aspect, the invention provides a time-delayed message display system for displaying a message pattern of a pH-indicating dye against a contrasting background at a predetermined time after activation, said message display system having an essentially laminar, multilayer construction and comprising:

a) a source layer supporting a migratable acid or base;

b) a timing layer to overlie said source layer, said acid or base being migratable through said timing layer;

c) a release layer protecting said acid or base from contact with said timing layer, said release layer being removable to activate the system by initiating migration of said acid or base through said timing layer; and d) a basic or acid buffer, respectively, to delay pH changes at said visible surface, whereby migration of sufficient acid or base to said visible surface provides a rapid color change in said pH-indicating dye.

BRIEF DESCRIPTION OF THE DRAWINGS

Some illustrative embodiments of the invention, and the best method known of carrying out the invention, are described in detail below with reference to the accompanying in which.

DETAILED DESCRIPTION OF THE PREFERRED EMBODIMENTS

Figure 1:
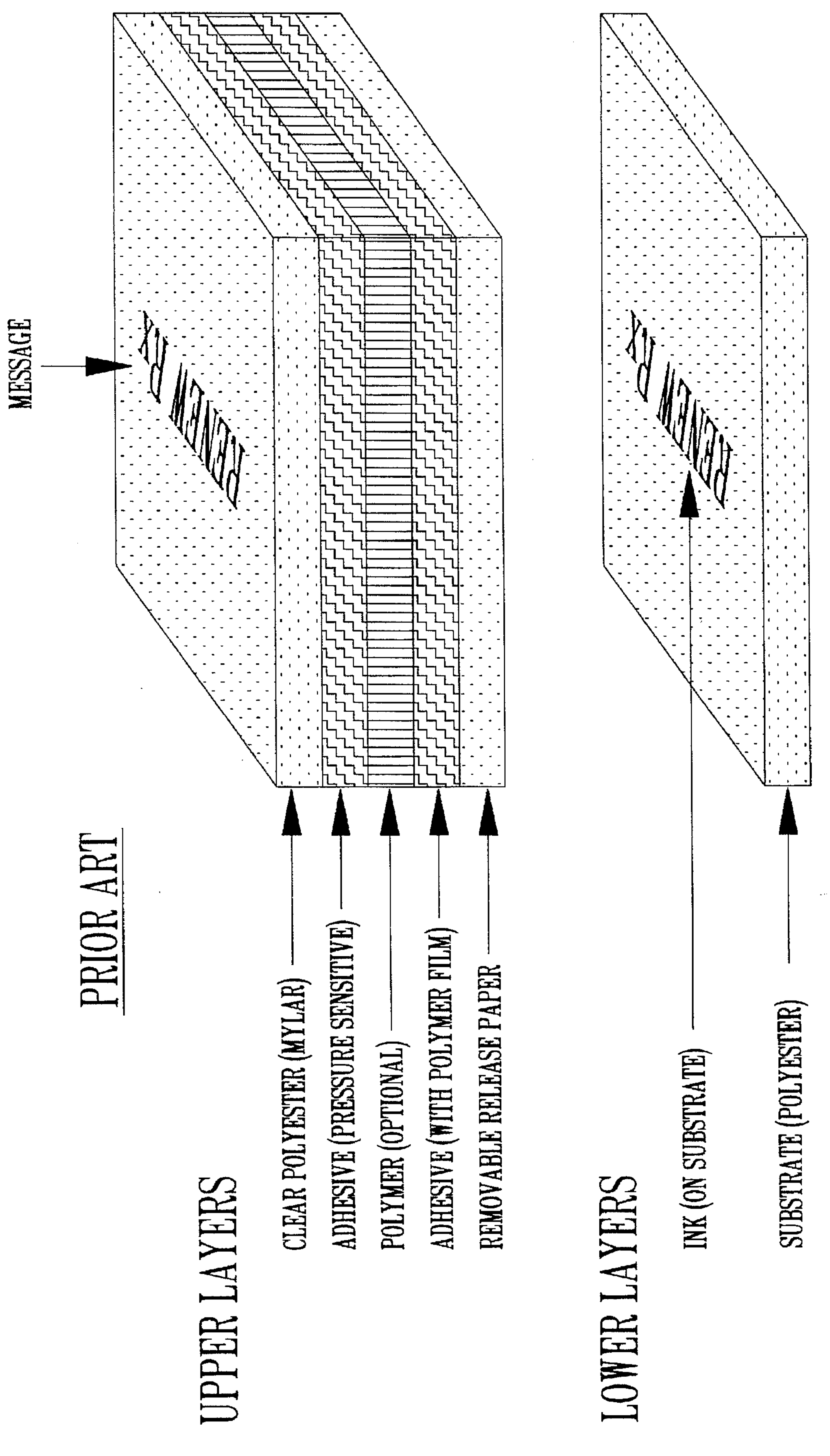
FIG. 1 is a schematic diagram of a prior art time-delayed ink message display system, shown prior to activation, with its lower layers separated from its upper layers for illustrative purposes.
Figure 2:
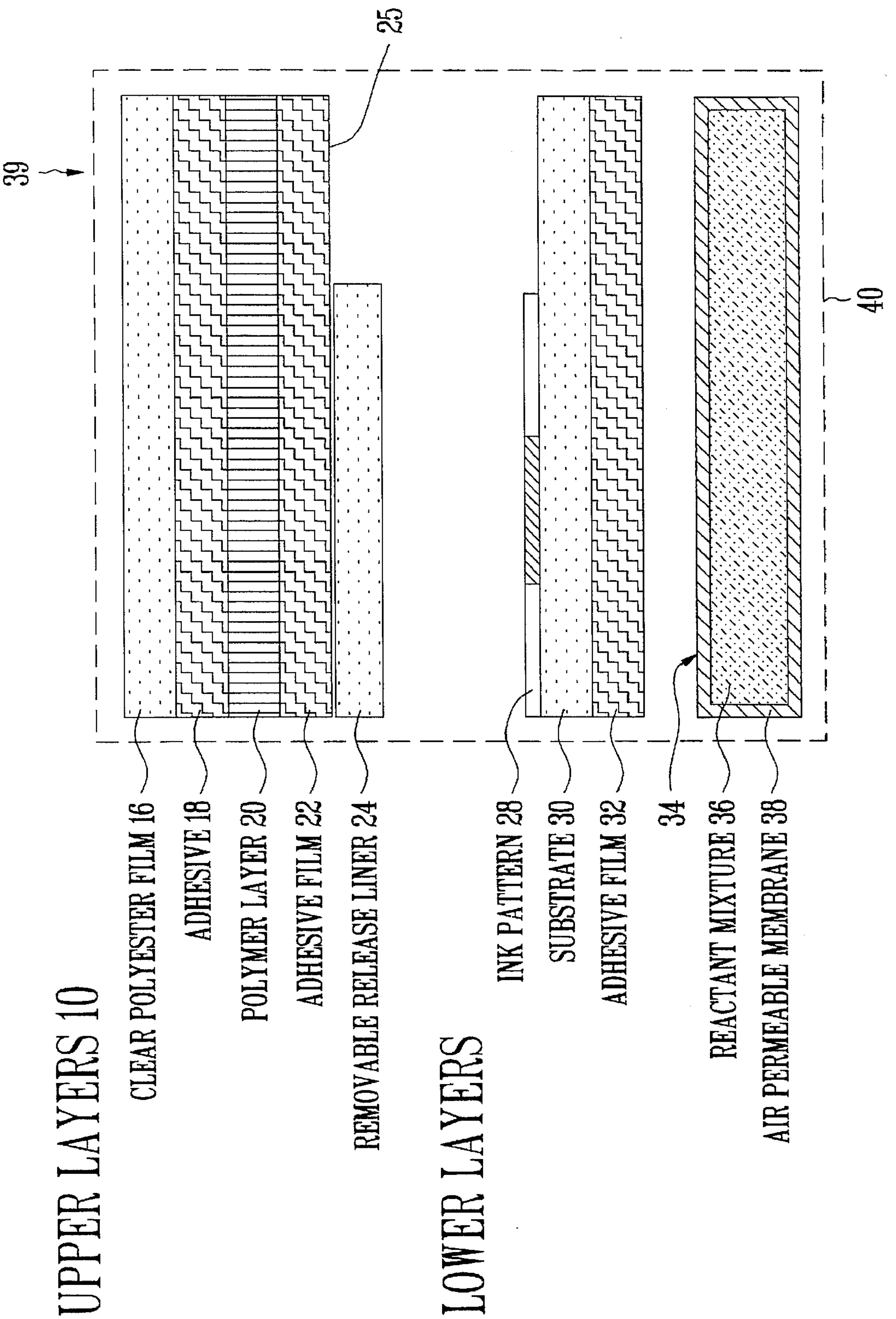
FIG. 2 is a schematic diagram, similar to FIG. 1, of a time-delayed ink message display system according to the invention.

Referring to FIG. 2, a time-delayed, ink message display system according to the invention comprises multiple upper layers 10 attached to multiple lower layers 12 at a small, adhesive-lined margin 25 of one of the upper layers. Upper layers 10 comprise an outermost dear polyester film 16 having an inner coating 18 of a pressure-sensitive adhesive.

Adhesive 18 is preferably a white opaque adhesive for display purposes, to hide a message image printed on a lower layer 12 and to provide a suitable contrast background for a message displayed at an upper layer 12. An optional migration retardant system is also shown and comprises a permeable polymer layer 20 coated with a pressure-sensitive adhesive film 22 which may or may not be opaque. A removable release liner 24 of paper, plastic or the like prevents premature dye migration. Release liner 24 leaves a margin 25 of adhesive film 22 is exposed at the bottom of the upper layers 10 and serves to adhere upper layers 10 to lower layers 12.

The optional migration retardant system shown as being comprised by polymer layer 20 coated with adhesive film 22 can be multi-layered employing any one or more of a variety of different polymers and adhesives such for example as 4.0 mil thick polyvinyl chloride films in grades of flexible, intermediately flexible or hard vinyl (available from Flexcon, Inc. Spencer, Mass.); and urethanes of comparable characteristics. Suitable adhesives include a 2 or 5 mil coatings of acrylic adhesives such as acrylic 927 and acrylic 950 (3-M, Minneapolis, Minn.), and V-22, V-122, and V-23 adhesives, in varying thicknesses, available from Flexcon, Spencer, Mass.

The lower layers 12 comprise an ink pattern 28 printed on a polyester film substrate 30 which has coated on its underside an adhesive coating 32, which may be pressure-sensitive, or for faster acting message display systems, is preferably a non-curing adhesive. The device is distributed with release liner 24 in place and upper layers 10 securely attached to lower layers 12 by a margin 25 of adhesive film 22 along an edge portion 39. The edge portion 39 of the display system or device effectively comprises a hinge about which the upper layers 10, or lower layers 12 may be peeled back.

In use, remote release liner 24 is removed manually and the upper layers 10 are pressed into engagement with the lower layers 12, bringing ink pattern 28 into contact with adhesive film 22, whereupon ink begins to migrate upwardly through the upper layers 10. Adhesive coatings 18 and 22 and polymer layer 20, through all of which the ink travels, together comprise the migration layers of the system. As the ink migrates through opaque adhesive coating 18, and accumulates above it, so an inked image becomes visible to a viewer of surface film 16. The image begins as a fuzzy, shapeless darkening, and develops with time into a clear or sharp rendition of ink pattern 28 in the form of the desired message.

In general, this structure is known from prior teachings, such as those of Pedicano and, as is extensively described above, suffers the problem of lack of focus.

To solve this problem, one embodiment of the invention provides a controllable heat pack 34 comprising a reaction mixture 36, contained within an air-permeable membrane 38. Reaction mixture 36, in this embodiment, comprises an oxidizable reactant, for example, iron filings which can be rendered oxidizable by air at room temperature by the inclusion of one or more catalyst materials such as ferrous sulfate solution, and activated carbon. With such constituents, heat pack 34 is capable of generating heat to accelerate migration of ink through the migration layers 18, 20 and 22 when air permeates through membrane 38. Those skilled in the art will be aware of other air-oxidizable exothermic reaction mixtures which can be used.

The complete device is assembled in a nitrogen atmosphere and sealed within an air-impermeable polymer film wrap 40. Activation of the completed device comprises two steps: first, the device is removed from film wrap 40, exposing it to ambient air which permeates into heat pack 34 and oxidizes reaction mixture 36; then the release liner 24 is removed and the upper layers 10 are pressed into contact with the lower layers 12 to begin migration of ink pattern 28 and enable heat generated by heat pack 34 to be conducted through to the migration layers, 18, 20 and 22. These two steps can easily be carried out in a short period of time, for example, in less than five seconds.

Although various materials may be used, the topmost layers, namely polyester film 16 and adhesive coating 18, which can be described as an opaque window, comprise a clear layer of MYLAR (trademark Dupont) polyester film coated on its inner surface with a thin white, opaque adhesive through which a dye can migrate rapidly. Surprisingly it has been found, pursuant to the present invention, that, the rate of dye or ink migration through a wide variety of polymer films is a strong function of temperature, and hence the rate at which the message appears is also a strong function of temperature. The rate of chemical reactions is usually a strong function of temperature, but ink migration through a polymer or adhesive film is not a chemical reaction.

More specifically, it has been discovered, pursuant to this invention, that a temperature increase of only about 20° C., for example from 23° C. to 43° C., can result in more than an order of magnitude increase in the rate of dye permeation. Such an increase can sufficiently accelerate the rate of dye migration through multiple layers to achieve a rapidly appearing message. A temperature increase from ambient of as little as 10° C. can be useful for some applications. Reactant systems capable of generating a greater temperature increase may be useful to further accelerate dye migration or to overcome cold ambient temperatures, for example in outdoor applications. However, for body contact applications, device surface temperatures should not exceed a warm-feeling 50 ° C. or so. Thus, heat pack 34 should preferably be capable of generating a device temperature increase in the range of about 10° to about 50° C., more preferably about 15° to about 30° C.

Thus, an increase of temperature at a certain time after the initiation of the message system can trigger the accelerated onset of the message, such that a clear, focused, readable message appears rapidly with respect to the complete migration time-scale. Various mechanisms for achieving an increase in temperature are possible, but the use of exothermic chemical reactions is preferred. Iron oxidation is an attractive exothermic reaction for use in the practice of this aspect of the invention, because the reactants and catalysts used are relatively safe, innocuous, inexpensive, and are not prone to explode, when handled properly. Also oxygen can be derived from ambient air, avoiding difficulties in separating, then mixing, reactants or the need for additional oxygen-bearing ingredients.

Some examples of preferred formulations of heat pack 34 and the temperature-elevating results obtainable with them are described hereinbelow.

Dyes and Inks

In the practice of the present invention, a displayed visual message is created by presenting a light-modulating image for viewing against a contrasting background provided by an upper layer. Preferably, the displayed image is formed by a migrating ink, dye or other light-absorbent material, which can be black, red, yellow, green, blue, or white, or any other desired color. The background material should provide adequate contrast for visibility, and preferred background colors, or materials, are selected as complements to the message color to provide optimum contrast at a given intensity, if it is desired to optimize development time and minimize the interval between onset of the image and complete or easy legibility of the image. However, where such contrast optimization is not necessary, desired or artistic effects can be obtained by using different combinations of foreground and background colors and intensities.

Several different dyes and dye mixtures are preferred for use in this aspect of the invention. One preferred dye is disperse red 60, or simply red 60 (1-amino-4-hydroxy-2-phenoxy-9,10-anthracenedione). Like many dyes, red 60 is pH-sensitive being red at acidic and neutral pHs, and purple at strongly alkaline pHs above about 10. Other useful dyes include yellow 54 (2-(3-hydroxy-2-quinolyl)-1,3-indandione, solvent blue 72 baflaxon black which is a mixture of red 60, yellow 54, and blue 72.

Preferably, the dyes are formulated into inks for use in the present invention. For test purposes water-based inks were prepared from these dyes by Gotham Ink Co. and "draw-downs" were fabricated by evenly coating each ink upon a polyester substrate. These ink-coated substrates were used in the tests described hereinbelow to illustrate the principles of the invention. In working embodiments of the invention the ink is printed in a pattern to form a message rather than completely coating a draw down.

EXAMPLES 1–8

Preparation of self-heating time-delayed message systems

The following reactants were utilized in experimental heat-generating reaction mixtures intended for incorporation in message systems according to the invention to accelerate dye migration.:

| | |
|---|---|
| Iron powder | 325 mesh, Aldrich Chemicals, Milwaukee, WI |
| Activated carbon | EM Science, Gibbstown, NJ |
| Ferrous sulfate | |
| Distilled water | |

These ingredients were used in the proportionate parts by weight shown in Table 1 below. Ferric sulfate was weighed and dissolved in the distilled water, the solution was combined with activated carbon, sealed, shaken, and allowed to equilibrate for at least 24 hours. Samples of iron powder were weighed out under nitrogen to prevent premature oxidation, combined with the ferric sulfate and active carbon mix, also in a nitrogen atmosphere, sealed, and mixed. Oxygen-permeable plastic film bags were filled with the reaction mixture and the ends sealed to prevent reactant leakage, and provide the message system heat pack.

The various layers of the message system were then placed on the heat pack and adhered or otherwise fastened to it, and the entire assembly was sealed inside an air-tight, oxygen-impermeable, polymeric film wrap. Initiation of the iron oxidation reaction and heat production began when the message system device was removed from the air-tight polymeric film wrap.

TABLE 1

Chemical Composition of Reactant Mixtures in Examples 1–8

| Example No. | Iron Powder | Activated Carbon | Distilled Water | Ferric Sulfate |
|---|---|---|---|---|
| 1 | 4 | 2 | 4 | 0.2 |
| 2 | 4 | 2 | 2 | 0.2 |
| 3 | 4 | 2 | 1 | 0.2 |
| 4 | 4 | 2 | 0.4 | 0.2 |

TABLE 1-continued

Chemical Composition of Reactant Mixtures in Examples 1–8

| Example No. | Iron Powder | Activated Carbon | Distilled Water | Ferric Sulfate |
|---|---|---|---|---|
| 5 | 4 | 6 | 2 | 0.2 |
| 6 | 4 | 0.8 | 2 | 0.2 |
| 7 | 4 | 1 | 1 | 0.2 |
| 8 | 4 | 6 | 6 | 0.2 |

EXAMPLE 9

The procedure of Examples 1–8 was repeated except that the heat-generating reaction mixture employed was a commercial mixture obtained from a product known by the trademark HANDIWARMER (International Horizons, Ann Arbor, Mich.), believed to comprise iron, water activated charcoal, unspecified salts, cellulose, and possibly, vermiculite.

TEST PROCEDURES

Various tests were conducted to verify the behavior of the systems of the invention by examining the migration of different dyes through different films and adhesives. To give the results practical significance, and consistency, a standard method was devised of tracking message development as migrating dye becomes visible in the opaque window.

A series of twelve color test pieces was prepared by applying various opaque windows to the above-described draw-downs on substrates coated with red dye 60. The a* value of each sample was measured in triplicate and averaged for each sample.

By conducting a number of tests with several people viewing the test pieces at a comfortable reading distance it was determined that an a* range of from 4 to 8, read on a L*a*b* -reading colorimeter for the migration of red dye 60, would satisfactorily approximate the development of a message from a fuzzy, incoherent image, to an image that was recognizable without difficulty by most viewers. More intricate message images than were used in the tests would require more development time to a higher a* reading for full clarity. a* is a standard scientific measure of hue value or intensity independently of lightness or brightness, L*. a* indicates the intensity of red hue on a red-green scale pursuant to the opponent color theory that a color cannot be both red and green at the same time. Negative values of a* are measures of the intensity of green. Similarly, b* measures the intensity of yellow on a blue-yellow color scale and negative values of b* measure the intensity of blue. a* values in the range of from 4–8 represent quite low, just visible intensities, the maximum a* or b* value being 60.

Figure 3:
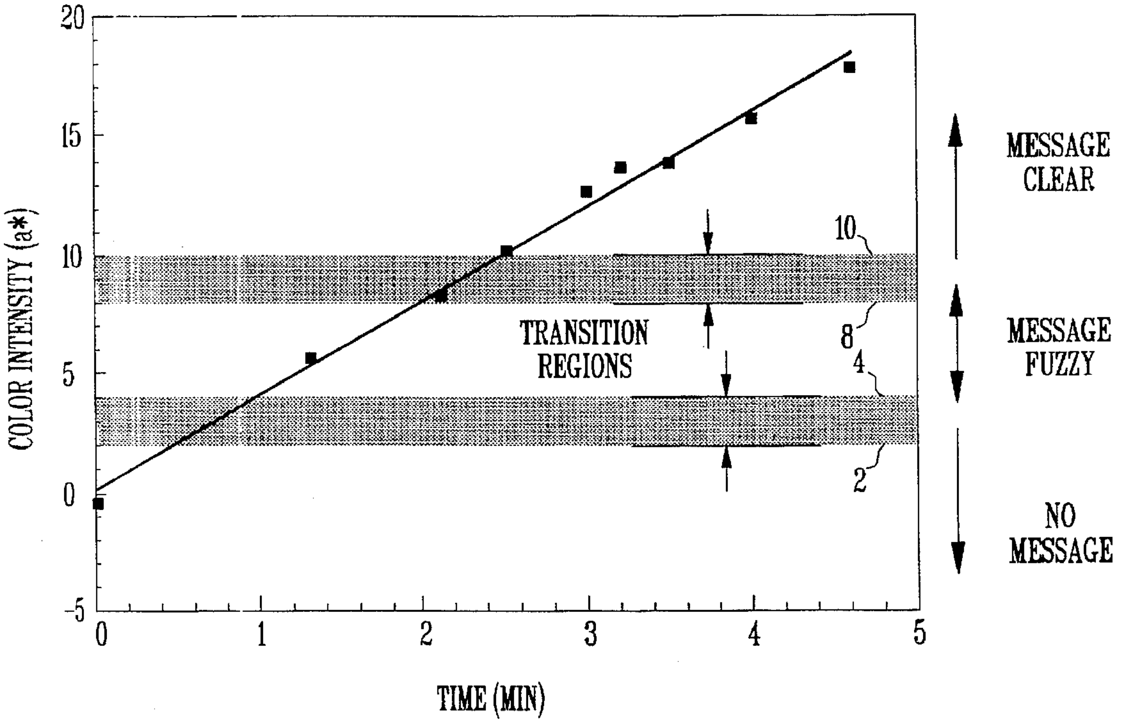
FIG. 3 is a graphic depiction of the time-related development of a message.

FIG. 3 illustrates the development of a migrating image graphically, showing transition regions at a* values of from 2–4 as a fuzzy message becomes detectable, and from 8–10 as the fuzzy message becomes clear.

While the tests described herein used red dyes and measured a*, dyes reflecting other hues could be used and different parameters such as b* or both a* and b* could be measured, as will be apparent to those skilled in the art. Other systems for measuring color are known and can be used. A Minolta Corp. CR-121 Chroma Meter operated in the L*-a*-b* mode was used in the experiments described herein, but other equivalent instrumentation can be used.

Measurements were made against a white background provided by opaque adhesive layer 18, and were indicative of the quantity of dye migrating to, and becoming visible through the opaque window. Measurement protocols were in accordance with the instrument manufacturer's recommendations.

Constant-temperature dye migration experiments

The rate of dye migration through various polymers and adhesives was experimentally determined by placing the upper layers 10 upon the lower layers 12 to initiate dye migration. Colorimetric measurements were made over time and the system was maintained at room temperature, about 22°–23° C. The rate of dye migration was quantified by performing a linear regression on the linear portion of the a* versus time plot or the L* versus time plot of the experimental data. The slopes of these plots, a*/t or L*/t, provide quantitative measures of the rate of dye migration. These data can be transformed into a more intuitively meaningful parameter, the characteristic migration time, τ, which is defined as the time required for the sample to reach an a* value of 8.0 from its initial state.

Dye migration through a polymer at a constant temperature is a gradual phenomenon governed by Fick's Law. This steady migration of dye is shown in FIG. 3, which shows changes in the color density of red 60 with time, as it migrated to the window in an experiment conducted at a temperature of about 43° C. through a layer of H-Polymer polyester film from Flexcon Inc.

Equivalent gradual increases over different time periods can be observed when other dyes migrate through polymers and adhesives of different types. The primary difference between dye diffusion through one polymer or adhesive and another polymer or adhesive is the rate at which the migration occurs. As shown in FIG. 3, the characteristic time for red 60 to achieve a strong color density is approximately 2 minutes. The characteristic time for dye migration through hard vinyl films at room temperature, on the other hand, is many months, even though the rate of migration is also steady or constant.

As shown in FIG. 2, the amount of time required for the color density to increase from below the intermediate region, a* values of between 4.0 and 8.0, to a color density above the intermediate region is in fact longer than the time required for the color intensity to reach the lower boundary of the intermediate region. A message system employing such a dye migration subsystem will have poor "focus" and is undesirable. Critical to improving the precision and focus of a time-delayed message system is to minimize the amount of time required for the color density to pass through the intermediate region. The longer the time the message strength is in the intermediate region, the greater the distribution of individual's interpretation of the message will be, the less precise will they be, and the more confusion will be engendered among people reading the messages.

Two-stage thermally-activated dye migration experiments

In these experiments, the message system was maintained at room temperature, about 22°–23° C., in a first stage, and was placed on a heating block in a second stage to accelerate the rate of dye migration. The heating block served as a controllable source of heat for test purposes. Colorimetric measurements were made over time as the dye migrated upwardly through the layers. Before an a* value of 4.0 was achieved, typically with an a* value of between 2.0 and 4.0, the message system was placed on a temperature- controlled steel heating block set at 43°–44° C. Colorimetric measurements were again made over time, at more frequent intervals. The resultant data were analyzed to determine the rate of dye migration, Δa/Δt or ΔL/Δt, and the characteristic migration time τ, as described above.

Figure 4:
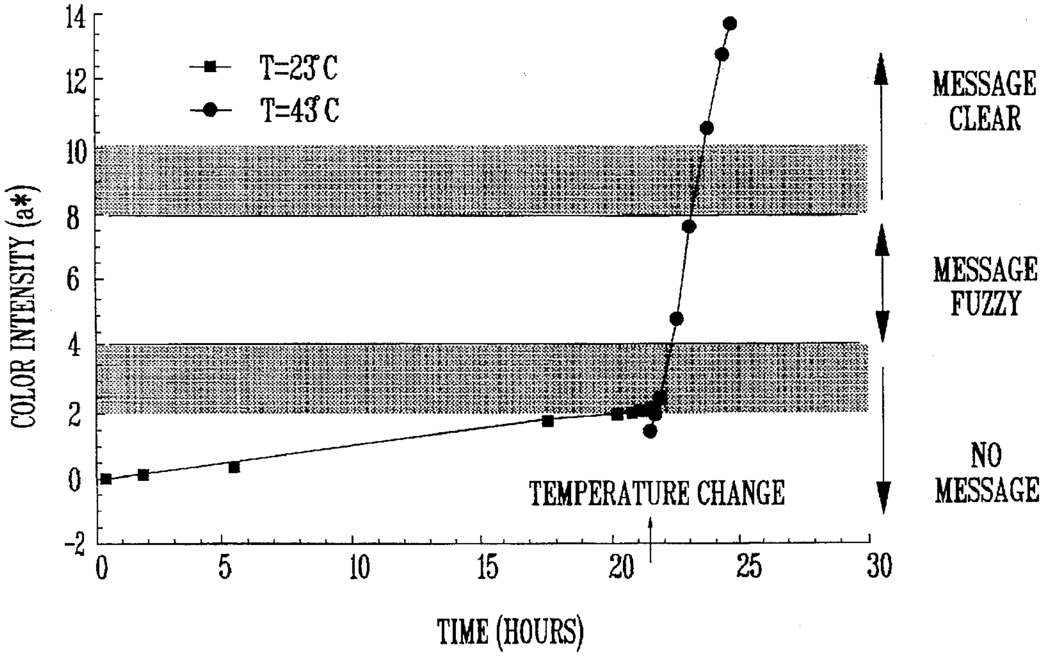
FIG. 4 is a graphic depiction of the results of a biphasic dye migration experiment.
Figure 6:
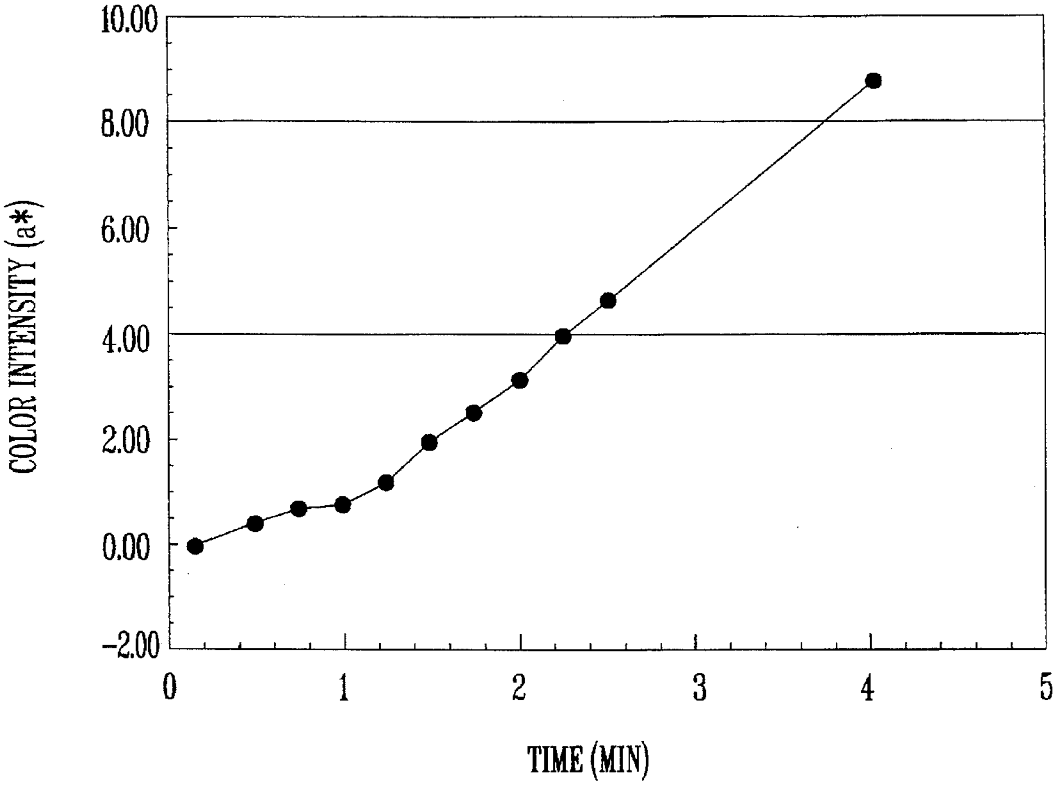
FIG. 6 is a graphic depiction of the effects of heat on dye migration pursuant to the experiment reported in FIG. 4.

Relatively modest increases in temperature were found significantly to increase the rate of dye migration through polymers and adhesives. FIG. 4 shows the results of a biphasic temperature experiment performed with red dye No. 60, acrylic #927 adhesive, and the opaque window described above. Dye migration was initiated at t=0 with all components at a temperature of 23° C. FIG. 4 shows that the rate of dye migration was relatively constant for the 21–22 hours the system was maintained at 23° C. Upon activating the system by placing it upon a 43° C. heating block, FIG. 6 shows that the rate of dye migration immediately increased to a sharply higher rate. Thus, only 1.5 hours is required for the message to become strong, once activated. Clearly a 1.5 hour transition time in a 25-hour delay system is small and provides an adequately sharp focus for many purposes with a focal ratio of 25 over 1.5, or about 17. FIG. 4 illustrates that a moderate thermal activation of only 20° C. is capable of triggering the migration of the dye and speeding the message development. One to two days additional time would probably have been necessary for the message to become strong had the system been maintained at 23° C.

Figure 5:
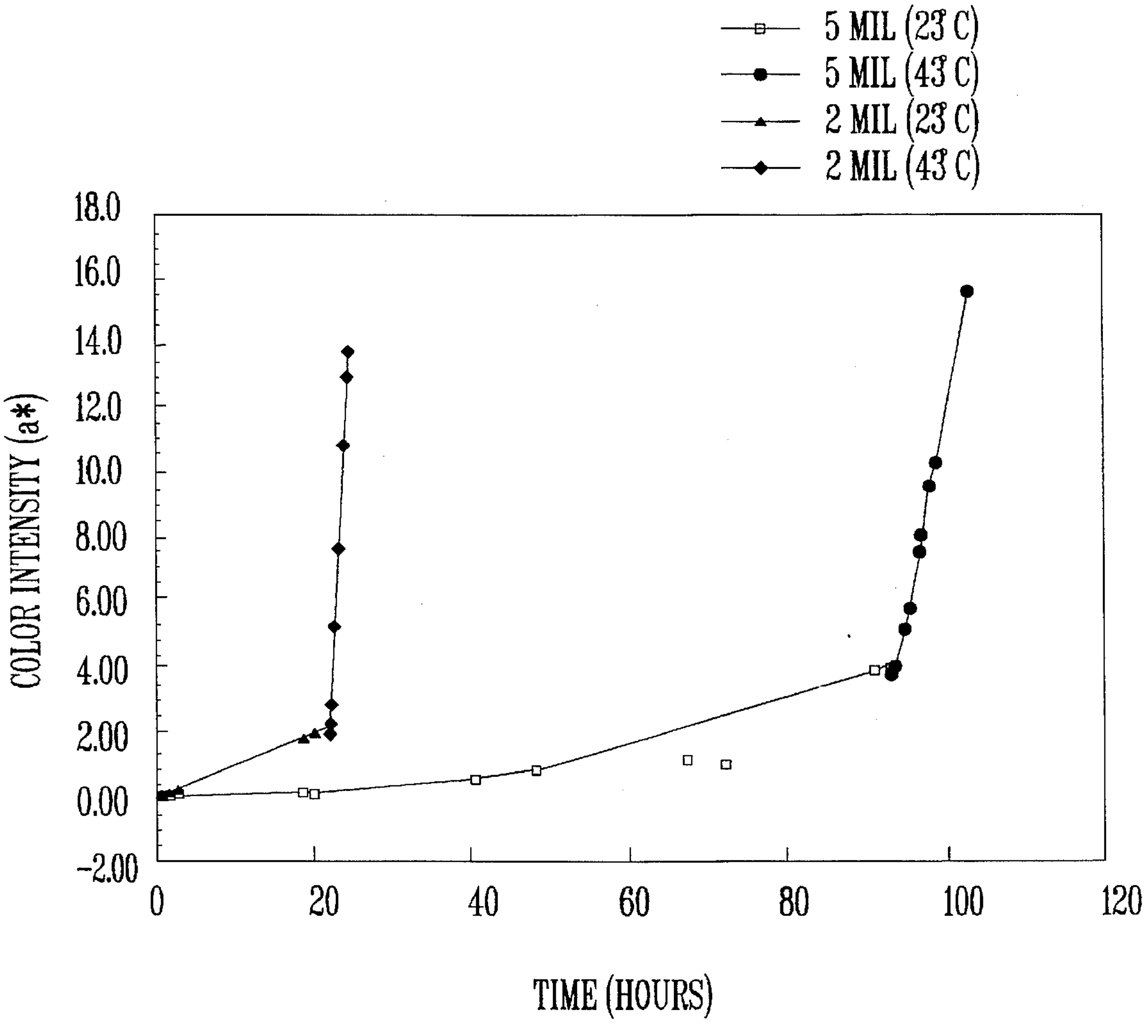
FIG. 5 is a graphic depiction of the results of the experiment reported in FIG. 4, to a different scale, along with the results of a further dye migration experiment.

FIG. 5 shows the results of the experiment reported in FIG. 4, to a different scale, along with the results of an experiment performed using red dye 60, acrylic adhesive 950, and the opaque window. The rate of dye migration with acrylic #950 is slower than that with acrylic #927 at 23° C. and only achieves an intermediate message strength after nearly 4 days. However, after activation by moderate temperature increases, migration through acrylic 950 rapidly accelerates.

Pursuant to the invention, it appears that this heat activation property is not limited to any particular class of polymers or adhesives, but is a general property of dye migration through materials. Apparently, the choice of polymer and adhesive dictate the rate of dye migration, and hence the time scale for the message system, but do not dictate the efficacy of the thermal activation.

The foregoing experiments show that heat is surprisingly effective in improving the focus of delayed message systems. Additional experiments with the heat packs of Examples 1–8 demonstrated that the novel heat pack systems were also effective in accelerating dye migration and improving message focus.

Table 2 below shows the results of the experimental examinations of the different chemical compositions of reactant mixtures of Examples 1–8.

TABLE 2

| Exothermic Reactant Mixtures | | | |
|---|---|---|---|
| Example No. | Max. Temp. °C. | Delay minutes | Consistency of Reactant Mixtures |
| 1 | — | — | Wet, sticky, and poorly mixed |
| 2 | 38 | 0.5 | Easily mixable |
| 3 | 53 | 0.5 | Easily mixable |
| 4 | 36 | 0.5 | Easily mixable |
| 5 | 46 | 0.5 | Easily mixable |
| 6 | — | — | Wet; Stuck to container |
| 7 | 43 | 0.25 | Slightly lumpy; difficult to mix |
| 8 | 48 | 0.5 | Very lumpy; poor consistency |

The maximum temperature achieved for the various mixtures ranged from 36° C. to as high as 53° C. Typically, approximately a half minute after activation was required for air ingress prior to commencement of the exothermic reaction, after which between 0.5 and 8 minutes were required to reach the maximum temperatures listed in Table 2. The mixtures of Examples 1 and 6, were of too poor a consistency to properly mix the reactants into a homogenous blend, and were therefore not evaluated. Example 3 was found to reach the highest temperature, 53° C., had good mixing capabilities, and exhibited a delay prior to the effective initiation of the exothermic heat production, and was therefore utilized in the thermally activated message systems experiments.

The Example 9, commercially available reaction mixture was found to reach a maximum temperature of 52° C. have a delay time of approximately 1 minute, and did not reach its maximum temperature until approximately 15–20 minutes after commencement of heat generation.

Experimental results with thermally activated message systems

The product of Example 3 was tested for dye migration as described above and the results are shown in FIG. 6. Red 60 was migrating through an opaque window, having no additional polymer or adhesive, while being activated by the exothermic oxidation of iron triggered by activating the heat pack of Example 3. FIG. 6 clearly shows an inflection point at approximately 60–80 seconds, below which the slope of color intensity versus time is gradual but steady and above which the slope is much steeper, showing a significant acceleration of the rate of dye migration after a delay time, attributable to the heat pack. The thermal activation reduced the amount of time for the signal strength to pass through the intermediate regions ($4 \leqq a^* \leqq 8$) by a factor of three, thus increasing the precision of the message by 300%.

Figure 7:
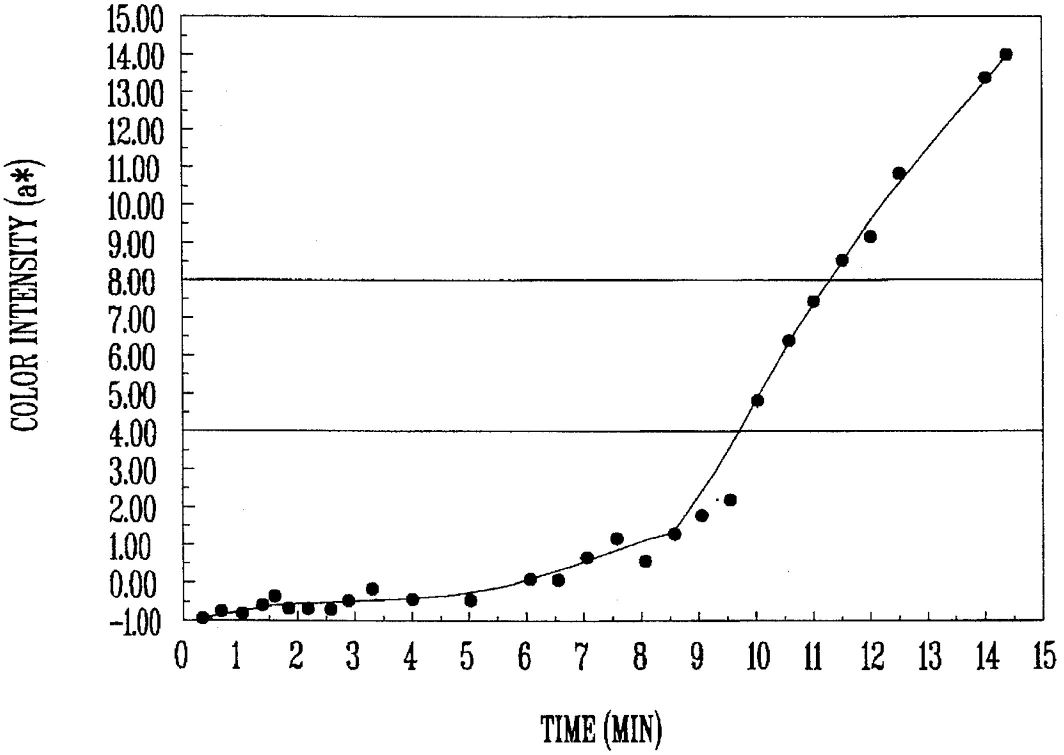
FIG. 7 is further graphic depiction of the effects of heat on dye migration in another experiment.

FIG. 7 shows the color density versus time of a message system activated by the exothermic oxidation of iron utilizing Example 9. Red 60 was the migrating dye, and an opaque window was used with the adhesive V-122 (Hexcon, Spencer, Mass.) as a supplemental barrier. FIG. 7 shows that the rate of dye migration is very slow initially, with little change in the color density at the eight minute mark. FIG. 7 also shows an inflection point at approximately 8–9 minutes, beyond which the rate of dye migration is much greater, and the message strength advanced through the intermediate region in only a minute and a half after activation by heat. Without thermal activation, the system would require three hours to reach a message strength of 8 (a* value). This represents a one-hundred fold, or 10,000%, decrease in the time required for the message strength to pass through the intermediate region.

The results illustrated in FIGS. 6 and 7 clearly demonstrate that exothermic chemical reactions can effectively accelerate dye migration through polymers and adhesives in order to achieve a strong, readable message in a narrow window of time after an initial delay.

PH-TRIGGERED EMBODIMENT

In an alternative embodiment which may be used with or without the heat pack 34 the message image is rendered with a pH-sensitive dye that undergoes a distinct color change at a specific pH. The dye is incorporated in the upper layers 10 and may comprise a continuous film across the window. Preferably, the dye is either acid-or base-buffered to sharpen its response.

A pattern of migratable acid or base is rendered on the lower layers. Migration of the acid or base pattern, which can, if desired, be accelerated by heat, arriving at the dye film produces a color change which, because of the buffering is rapid.

Alternatively the dye may be printed on the upper layers against a non-contrasting background at one pH so that arrival of migrating acid or base triggers a color change to a contrasting color making the printed dye image visible. This embodiment has the advantage of not requiring migration of a well defined image material.

INDUSTRIAL APPLICABILITY

The present invention is particularly suitable for application in any industry where and economical elapsed time indicator is useful, for example, for distribution with a product or as a label on a product. The invention can, for example, be embodied as a multi-layer label usable as a shelf-life indicator for foods, food supplements, medications ,film or other perishables. The characteristic delay period of the inventive message system will then be selected, by appropriate choice of the design parameters of the system, as disclosed herein, to be of the order of weeks, months or a year or two, as the product requires.

Another application, or embodiment, is as a timer for a diagnostic kit, as referenced hereinabove, which timer embodiment can economically be included in the kit, if desired. The kit user removes a release layer to initiate the delayed message system, and after a predetermined period of time, for example the reaction time of ingredients the user has mixed together, a message appears. Unlike a clock timer which simply indicates the passage of time the inventive delayed message system can display a product-related message, such as "STOP" or "ADD INGREDIENT 3" or "BEGIN STAGE 2". Such kit timer systems are likely to have a delay period of some number of minutes, or perhaps seconds, e.g. 2 or 3 minutes or 20 or 30 seconds.

Another valuable embodiment is a time delay indicator label for repeatable medications or medicines. Such a label is preferably designed to be attention-getting and can indicate the elapse of periods such as four, six or twelve hours. Other useful embodiments of the invention will be apparent to those skilled in the art.

While some illustrative embodiments of the invention have been described above, it is, of course, understood that various modifications will be apparent to those of ordinary skill in the art. Such modifications are within the spirit and scope of the invention, which is limited and defined only by the appended claims.

We claim:

1. A time-delayed message display system for displaying a message pattern of a colorant at a viewable surface against a contrasting background, the message pattern being viewable by reflected light at a predetermined time after activation of the message display system, said message display system having an essentially laminar, multilayer construction and comprising:

a) a source layer;

b) a migratable message agent supported on the source layer;

c) a viewable surface;

d) an opaque polymer film layer to overlie said source layer and to provide said viewable surface or to lie between said viewable surface and said source layer, said message agent being migratable through said opaque polymer film layer to said viewable surface; and e) a release layer protecting said message agent from contact with said opaque polymer film layer, said release layer being removable to activate the system by initiating migration of said message agent through said opaque polymer film;

wherein arrival of said message agent at said viewable surface initiates development of a visible message pattern, said message display system further comprising:

f) a message development trigger acting to accelerate migation of said message agent through said opaque polymer film to promote said development of a visible message pattern; and g) a trigger delay means to delay action of said message development trigger; whereby development of said visible message is accelerated and initiation of development is delayed by said trigger delay means.

2. A message display system according to claim 1 wherein the message agent comprises a migratable colorant material, the message development accelerator comprises a chemical reactant heating system and the trigger delay means comprises a removable barrier preventing said chemical reaction.

3. A message display system according to claim 2, wherein said migratable colorant material is an ink printed in a message pattern on said source layer and said chemical reactant heating system comprises an air-oxidizable reactant.

4. A message display system according to claim 3, wherein said removable barrier comprises an external sealant film enclosing the display system.

5. A message display system according to claim 2, wherein said removable barrier comprises a degradable coating encapsulating said chemical reactant.

6. A message display system according to claim 2, wherein said opaque polymer film layer comprises at least one film of migration rate controlling material having a thickness and composition selected to provide a desired migration time.

7. A message display system according to claim 2 wherein said predetermined time has a duration at least ten times that of a development time from a point at which said message pattern is discernible to a point at which it is clearly legible or determinable.

8. A time-delayed message display system for displaying a message pattern of a colorant on a viewable surface against a contrasting background for viewing by reflected light, at a predetermined time after activation, said message display system having an essentially laminar, multilayer construction and comprising:

a) a source layer supporting a printed image of said colorant in a desired message pattern;

b) an opaque polymer film layer to overlie said source layer, said colorant being migratable through said opaque polymer film layer; and c) a release layer protecting said colorant from contact with said opaque polymer film layer, said release layer being removable to activate the system by initiating migration of said colorant through or to said opaque polymer film layer;

wherein said message display system further comprises:

d) a chemical reactant heating system to trigger rapid development of the message at said visible surface by heating said opaque polymer film layer to accelerate migration of said colorant through said opaque polymer film; and e) a removable barrier preventing said chemical reactant heating system from reacting.

9. A time-delayed message display system for displaying a message pattern of a pH-indicating dye against a contrasting background at a predetermined time after activation, said message display system having an essentially laminar, multilayer construction and comprising:

a) a source layer supporting a migratable acid or base;

b) a timing layer to overlie said source layer, said acid or base being migratable through said timing layer;

c) a release layer protecting said acid or base from contact with said timing layer, said release layer being removable to activate the system by initiating migration of said acid or base through said timing layer; and d) a basic or acid buffer, respectively, to delay pH changes at said visible surface, whereby migration of sufficient acid or base to said visible surface provides a rapid color change in said pH-indicating dye.

10. A time-delayed message display system according to claim 11 further comprising d) a chemical reactant heating system to trigger rapid development of the message at said visible surface by heating said opaque polymer film layer and a removable barrier preventing said chemical reaction.

11. A time-delayed message display system for displaying a message pattern of a colorant on a viewable surface against a contrasting background for viewing by reflected light, at a predetermined time after activation, said message display system having an essentially laminar, multilayer construction and comprising:

a) a source layer supporting a migratable message agent;

b) an opaque polymer film layer to overlie said source layer, said message agent being migratable through said opaque polymer film layer; and c) a release layer protecting said message agent from contact with said opaque polymer film layer, said release layer being removable to activate the system by initiating migration of said message agent through or to said opaque polymer film layer;

wherein arrival of said message agent at said viewable surface initiates development of a visible message pattern, said message display system further comprising: and d) a message development trigger acting to accelerate migration of said message agent through said opaque polymer film to promote said development of a visible message pattern;

whereby development of said visible message is accelerated.

* * * * *